United States Patent [19]
Meyer et al.

[11] Patent Number: 5,505,759
[45] Date of Patent: Apr. 9, 1996

[54] GLASSWARE FORMING MACHINE

[75] Inventors: Willi Meyer, Effretikon; Zdenko Kuz, Zug; Robert Huber, Wettingen, all of Switzerland; Ove P. Pilskaer, Sundsvall, Sweden

[73] Assignee: Emhart Glass Machinery Investments Inc., Wilmington, Del.

[21] Appl. No.: 227,138

[22] Filed: Apr. 13, 1994

[30] Foreign Application Priority Data

Apr. 15, 1993 [GB] United Kingdom ............... 9307837

[51] Int. Cl.⁶ .................................................. C03B 35/10
[52] U.S. Cl. .................. 65/305; 65/319; 65/261; 65/267; 65/66; 65/83
[58] Field of Search ............... 65/227, 243, 233, 65/232, 228, 229, 230, 231, 234, 235, 236, 237, 238, 239, 240, 241, 242, 244, 245, 246, 247, 248, 249, 250, 251, 252, 253, 254, 255, 256, 257, 261, 267, 305, 319, 66, 83

[56] References Cited

U.S. PATENT DOCUMENTS

| 2,084,285 | 6/1937 | Wadman | 65/230 |
| 2,151,876 | 3/1939 | Wadman | 65/230 |
| 3,552,942 | 1/1971 | Trudeau | 65/243 |
| 4,362,544 | 12/1982 | Mallory | 65/163 |

FOREIGN PATENT DOCUMENTS 0184394  11/1986  European Pat. Off. .

Primary Examiner—David L. Lacey
Assistant Examiner—Calvin Padgett
Attorney, Agent, or Firm—Spencer T. Smith

[57] ABSTRACT

A pneumatically operated mechanism for a glassware forming machine is located in an aperture in a top plate of the machine and comprises entry ports in a downwardly facing surface which mate with exit ports for air supplies located in an upwardly facing surface of the top plate.

2 Claims, 11 Drawing Sheets

GLASSWARE FORMING MACHINE

This invention is concerned with machines for the manufacture of glassware.

BACKGROUND TO THE INVENTION

One of the most widely used types of machines for the manufacture of glassware is the so-called I.S. machine, which machine comprises a plurality of identical sections arranged side by side, the sections operating continuously out of time with each other to produce glassware. The I.S. machine has developed over the last sixty years from the original machine of this type described in U.S. Pat. No. 1,911,119—Ingle.

While during this period of sixty years there have been many improvements in I.S. machines, e.g. increased number of sections, increased numbers of moulds in each section, electronic control mechanisms replacing mechanical controls, the basic mechanical structure of the I.S. machine has remained unaltered.

Among the features which are common to almost all existing I.S. machines are the following;

1. The various mechanisms of the machine are integrated into a machine frame, and access to repair such mechanism is difficult.
2. The various mechanisms are generally pneumatically operated, and a complex array of piping is necessary to provide the required supplies of compressed air. This piping is very time consuming (and thus expensive) not only to assemble in manufacture but also to repair.
3. If any substantial repair is necessary to a section, the whole I.S. machine (i.e. all the sections) has to be shut down while the repair is carried out.
4. The various sections are mounted side by side in a machine frame, having upright frame members which support ancillary mechanisms, for example gob distributors. Air supplies to the various sections are provided from piping leading from these upright frame members. Consequently there is a risk of different pneumatic conditions obtaining in sections remote from the upright frame members and those close to them, a risk which increases with the number of sections in the machine which is now frequently 12 or more.

EP 184394 describes a fluid operated individual section glassware forming machine. The intention is that the machine should be capable of adaptation for either pneumatic or hydraulic operation, and to avoid the proliferation of pipes which would result, the machine is so constructed that fluid under pressure to operate the various mechanism of the machine is provided through passageways formed in the plates providing the framework of the section. While the possibility of utilizing these passages for pneumatic operation is mentioned, it is not described; the description is of use of the passageway for hydraulic fluid while conventional pipe work is used for pneumatic operation. Consequently no indication is given of elimination of pipe work for pneumatic operation between the conventional valve block, used in such pneumatic operation, and the passageways. Particular problems would seem likely to arise in this respect as the initial part of the passageways are in a base plate of the section.

Further EP 184394 envisages the use in the machine of conventional mechanisms, that is to say mechanisms which are integrated into the machine frame and which are therefore not easily accessible for repair or replacement.

It is one of the objects of the present invention to provide a glassware forming machine comprising a pneumatically operated mechanism which is readily removed from a frame of the machine for replacement or repair.

BRIEF DESCRIPTION OF THE DRAWINGS

In the accompanying drawings

DESCRIPTION OF THE PREFERRED EMBODIMENT

Figure 1:
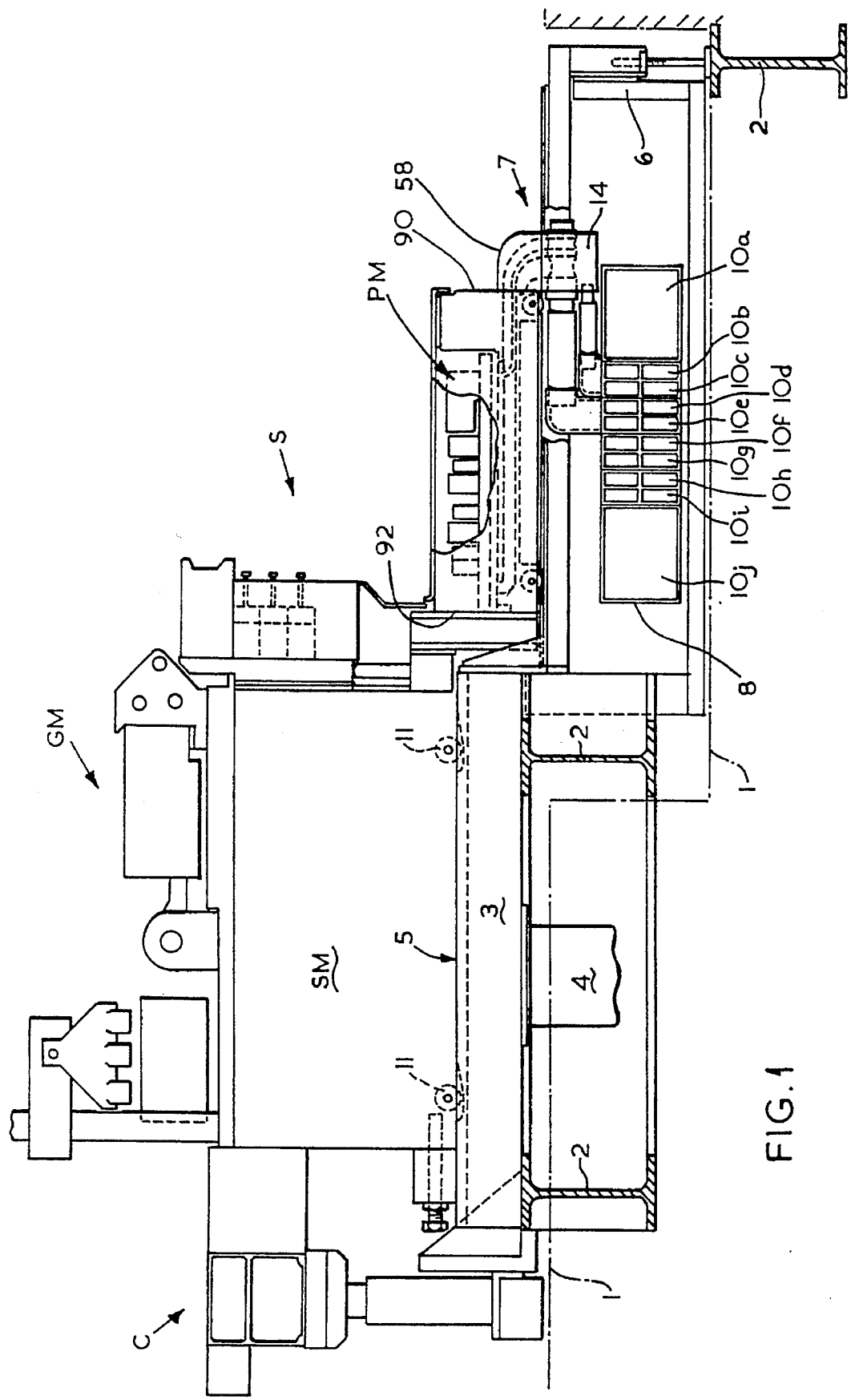
FIG. 1 shows a side view of a section of a glassware forming machine embodying the invention.

An individual section of a glassware forming machine embodying the invention comprises a plurality (usually 8–12) of similar sections S arranged side by side at section stations. Each of the sections comprises a section module SM and a piping module PM, which are interconnected with each other. Each section module SM supports the various glass forming mechanisms GM (diagrammatically indicated in FIG. 1) of the section, while the piping module PM supplies air needed to operate such mechanisms.

The machine is supported on a floor 1, comprising transverse supporting girders 2 providing an upper and a lower portion of the floor 1. Supported on the upper portion of the floor 1 is a base framework 3 in the form of a box for each section and having an upper surface 5 on which, as will be described, a section module SM is located. Behind the base framework 3 is a subsidiary framework 6 supported on the lower portion of the floor 1: the piping modules PM are supported on the subsidiary framework 6. A pipe 4 leading from a supply of cooling air passes upwardly through the floor 1 and into the interior of the framework 3 at each section. A conveyor C is supported on the floor 1 and extends past all the section stations to remove formed containers from the sections in a conventional manner.

At each section station, the piping module PM and the section module SM are mounted so that they can be moved into and out of operating positions. Extending transversely across all the section stations through the subsidiary framework 6 is a manifold 8 which comprises a series of transverse parallel air supply passages 10. When the section module SM and the piping module PM are in their operating positions at the section station, the section module SM is connected to the piping module PM and the piping module PM can be connected to the air supply passages 10. When desired, for repair or replacement, the piping module PM can be simply disconnected from the air supply passages 10 and from the section module SM and removed from the section station, and the section module SM can then itself, if required, be removed from the section station without necessitating any interruption of operation of the other sections of the machine.

The construction and operation of the Section Module SM and Piping Module PM at one section of the machine will be described—it will be understood that the Section Modules SM and Piping Modules PM at the other section stations are similar.

In an individual section glassware forming machine the air which serves to cause movement of the parts of the mechanisms of the machine is termed 'operating air'. Normally operating air comprises air containing a certain amount of suspended oil as a lubricant. Vacuum and exhaust connections are also normally viewed as 'operating air' and the phrase 'operating air supplies' when used herein will be used to include not only air for causing movement of machine parts, but also exhaust and vacuum associated with it.

Air supplies which come into contact with the glass are termed 'forming air supplies' and do not contain suspended oil. Mould cooling air, or cooling wind, is distinct from both operating air and forming air.

Operating air supplies are provided to each section through the transverse supply passages 10. There are ten of these supply passages which carry the following operating air supplies:

10a Vacuum

10b Low pressure-pilot air

10c Low pressure-plunger cooling air

10d & 10e High pressure air

10f Plunger up air

10g Spare

10h & 10i Low pressure air

10j Exhaust

At each section station of the machine, a connecting assembly 7 is provided which connects the transverse supply passages 10 to the piping module PM at the station.

At each section station there is provided a shut off block 14 mounted in the framework 6. The block 14 comprises a series of passages each associated with the air supply from appropriate supply passages 10, each passage of the shut off block 14 leading from an entry port 21, past a valve member 32 in the form of a spool, to an exit port 28.

At each section station, the section module SM and the piping module PM are each mounted for movement lengthways of the section station in and out of their operating positions. It will be understood that the operating position of the section module SM is that in which the mechanisms of the module are properly aligned to receive glass from glass supply means of the machine (not shown) and to pass out formed containers to the conveyor C.

The piping module PM is located in its operative position by engagement with the section module SM and the shut off block 14.

Figure 2:
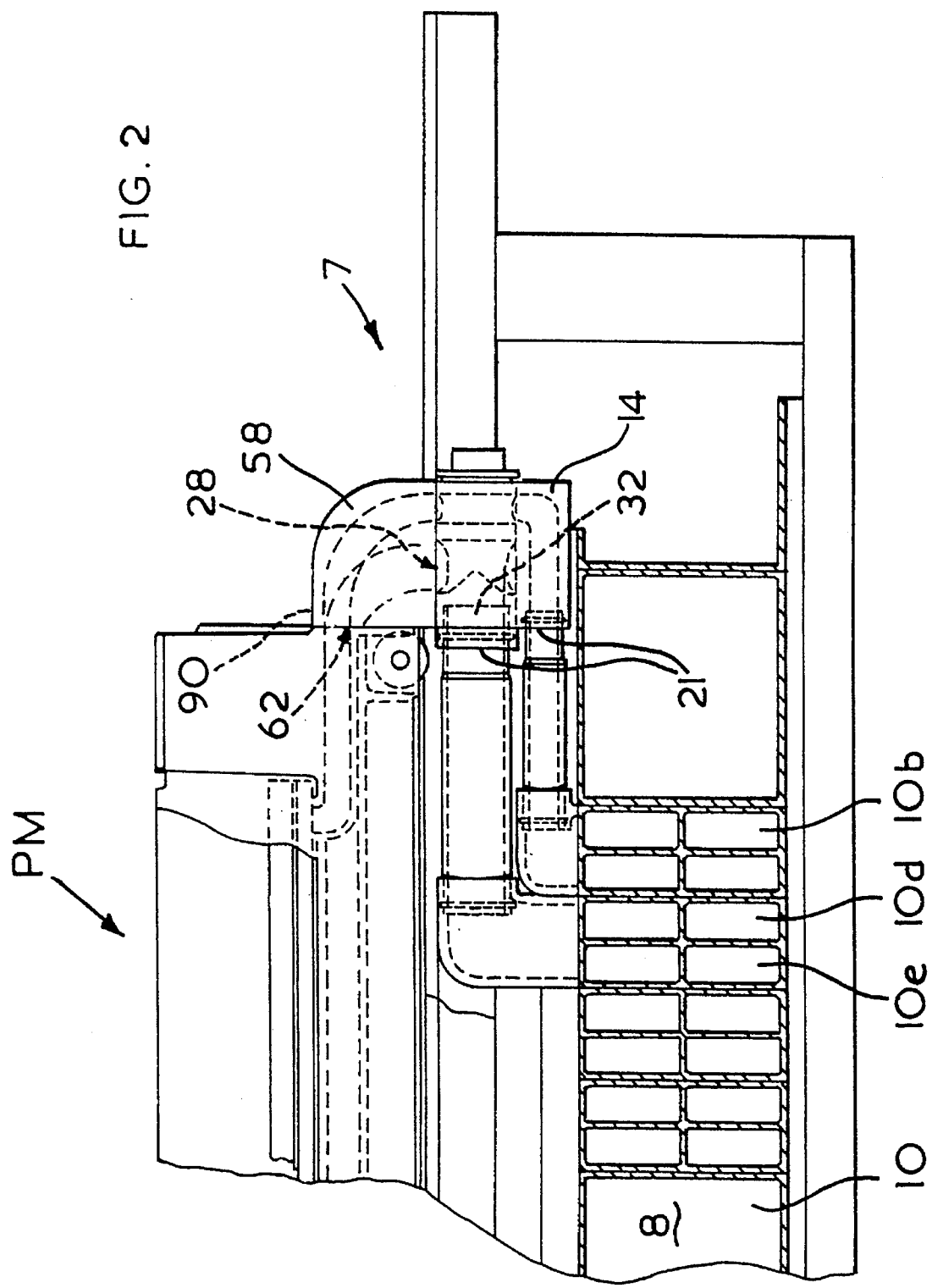
FIG. 2 shows certain parts of FIG. 1 enlarged and in section.

The piping module PM comprises a connector 58 [FIG. 2A and 2] which, when the piping module is in its operating position, mates with the shut off block 14.

It is to be understood that the piping module PM is designed to receive air under pressure and vacuum (provided from the supply passages 10, through the shut off valve block 14 and the connector 58) and to provide a series of control pathways extending from entry ports 62 in a rearward end wall 90 of the piping module to exit ports 112 in a forward end wall 92 of the piping module. These control pathways include pressure control valves and on/off control valves as required to enable air to be supplied to the exit ports 112 at the required times and pressures to enable the operation of the pneumatically operated mechanisms of the section module SM.

Figure 3:
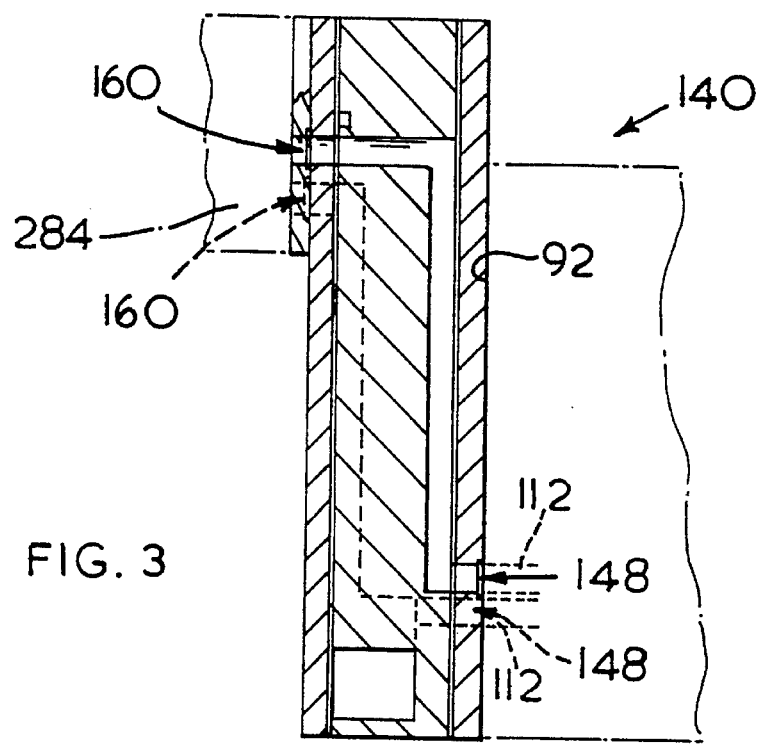
FIG. 3 shows a view in section of a connector block of the piping module.

The piping module PM comprises a distributor block 140 by which it may be connected to the section module SM (FIG. 3).

The distributor block 140 is capable of providing a series of connecting paths, which may if necessary overlap, between a series of entry ports 148 and a series of exit ports 160.

Figure 7:
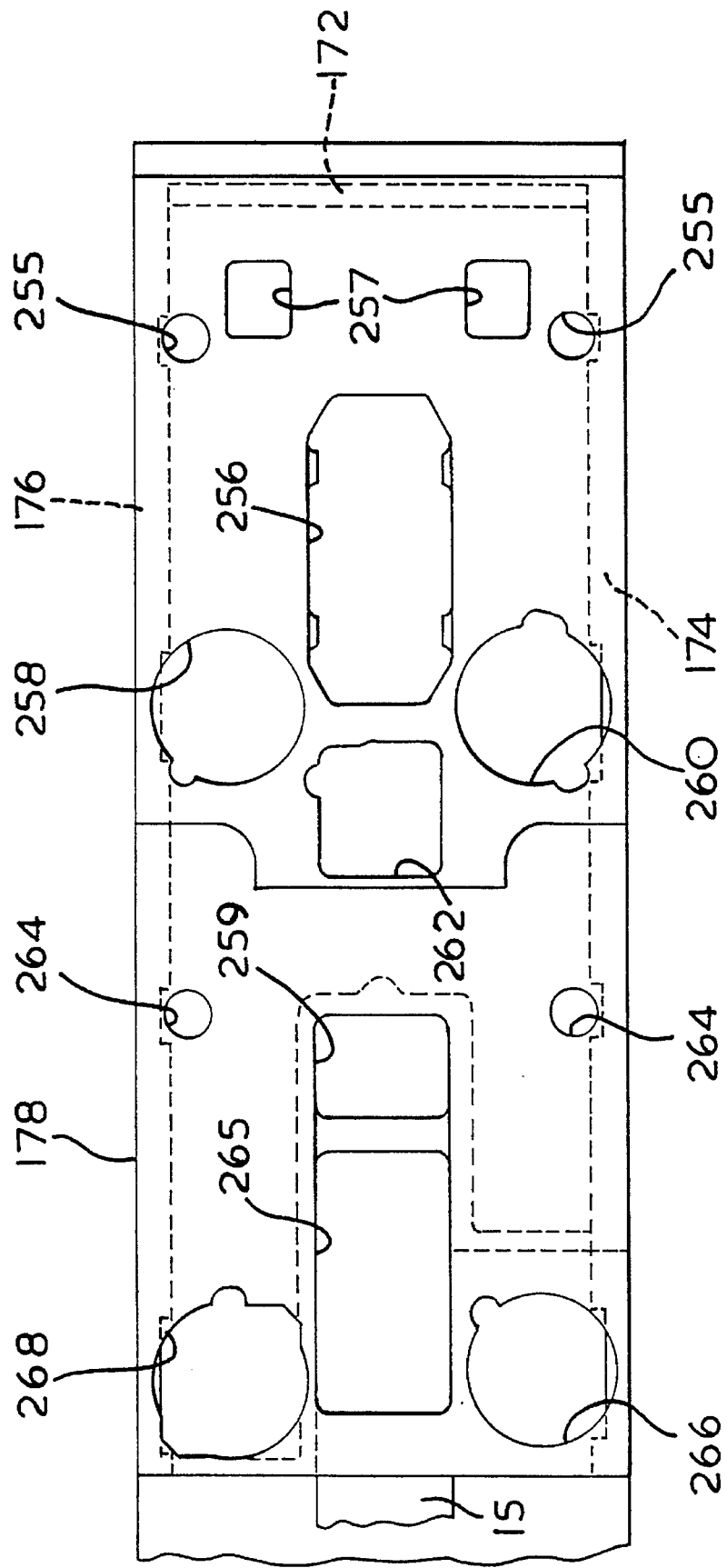
FIG. 7 shows a plan view of a top plate of the section module.
Figure 8:
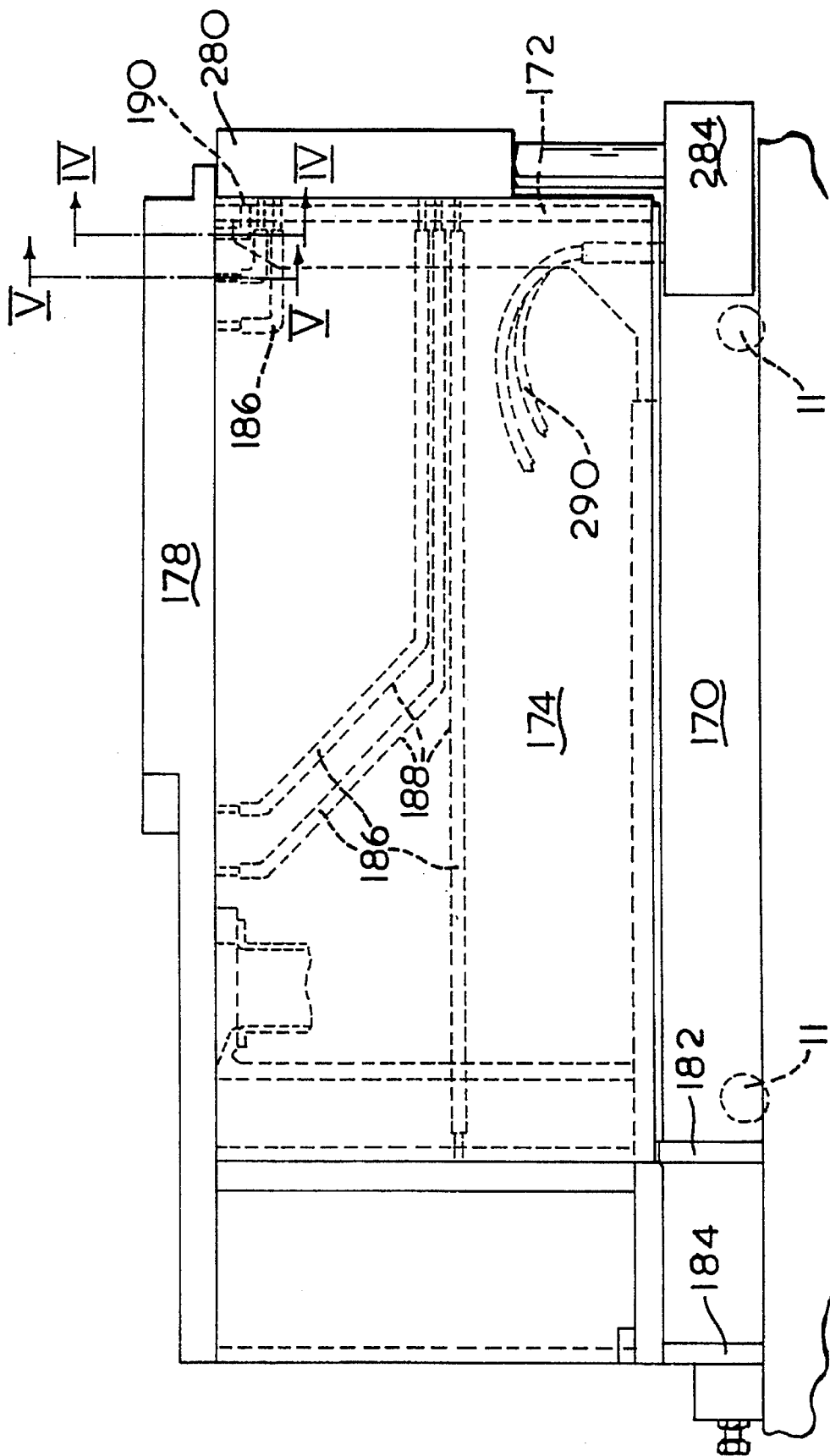
FIG. 8 shows a side view of a frame of the section module.
Figure 9:
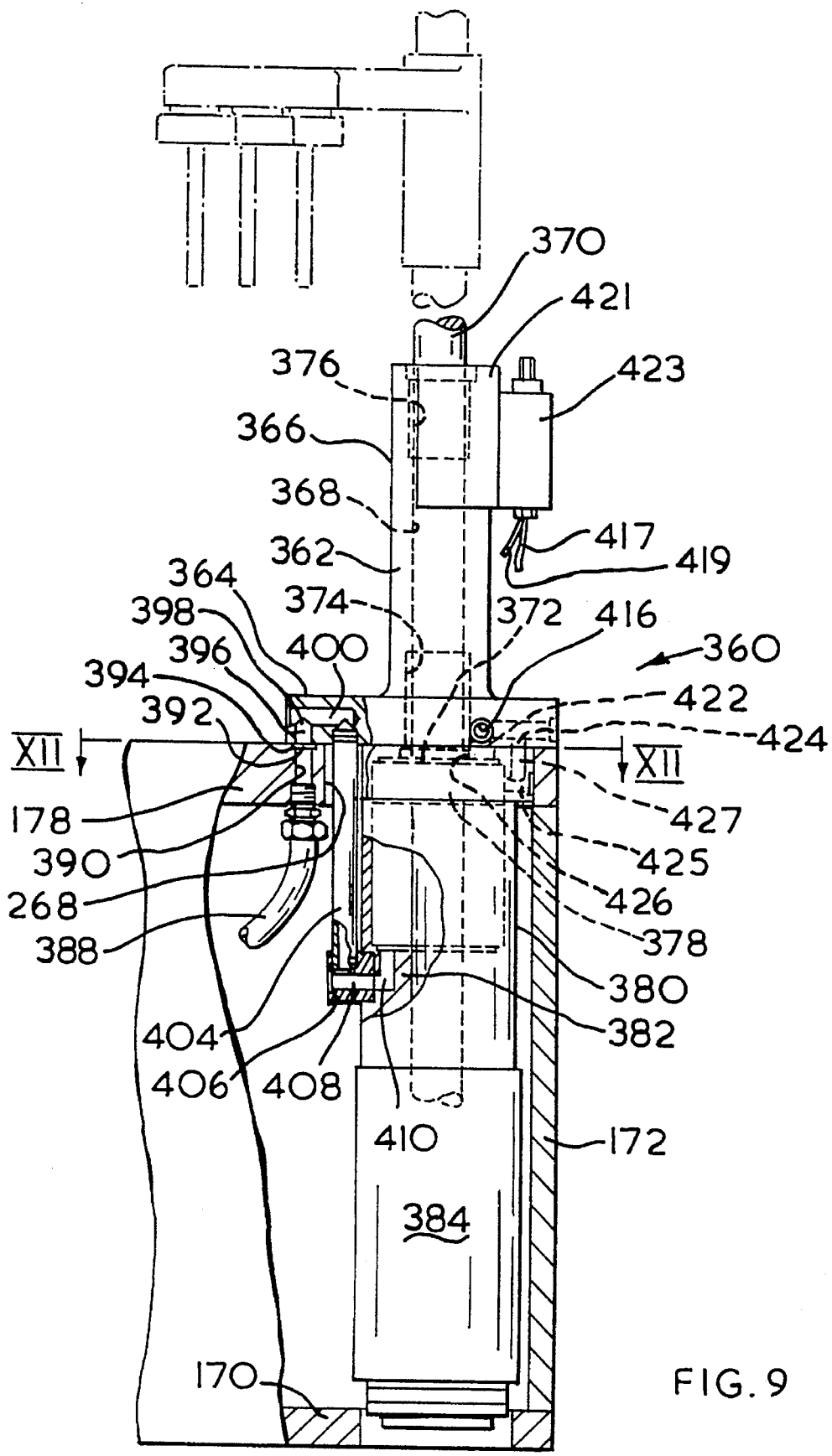
FIG. 9 shows a view, partly broken away, of a blowhead mechanism.
Figure 10:
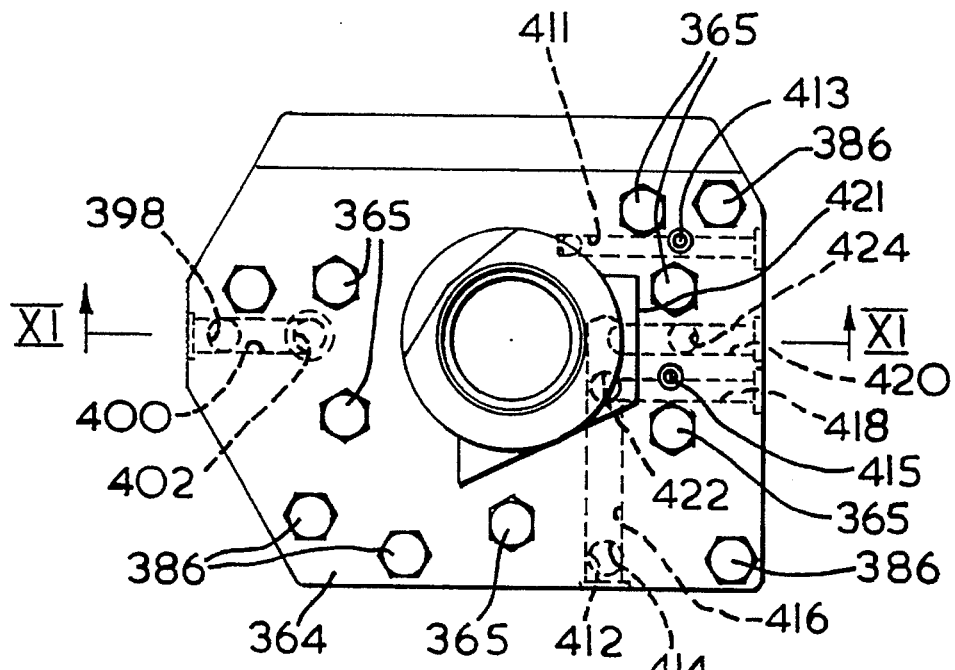
FIG. 10 shows a plain view of a supporting member of the blow head mechanism.
Figure 11:
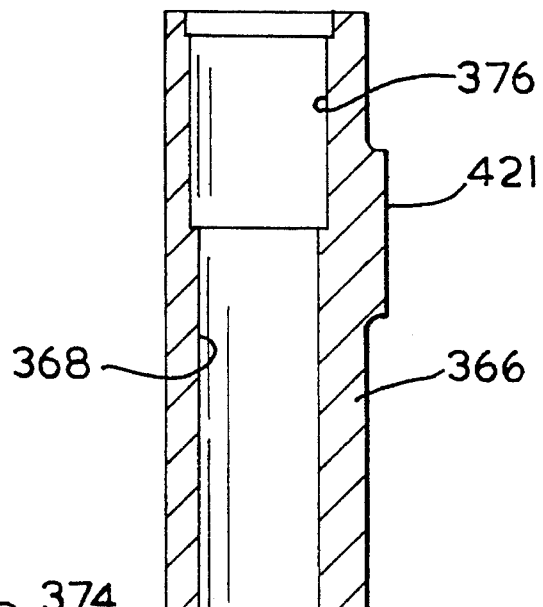
FIG. 11 shows a view in section along the line XI—XI of FIG. 10.
Figure 12:
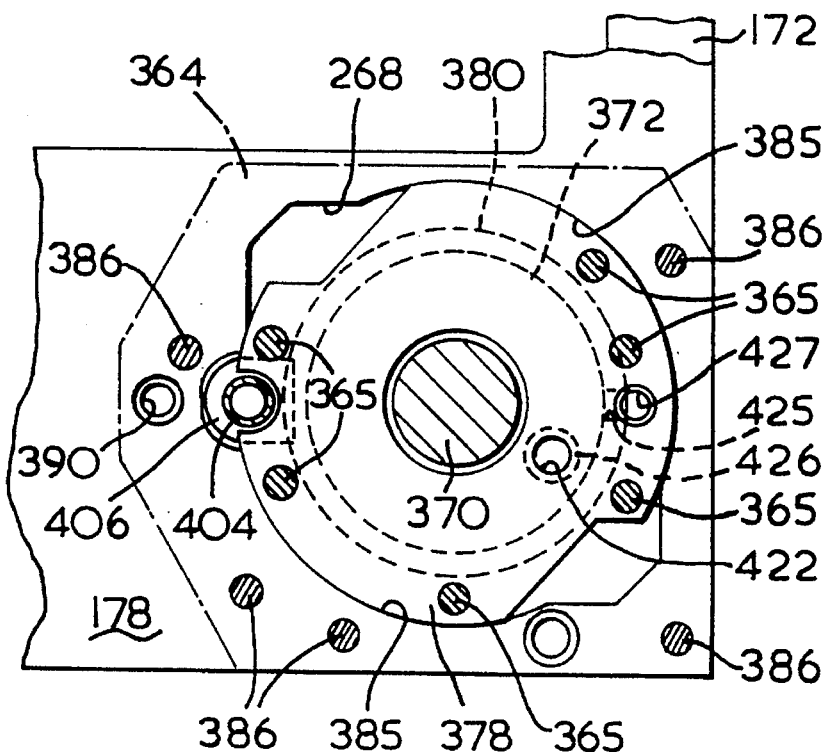
FIG. 12 shows a view taken along the line XII—XII of FIG. 9.

The Section Module comprises a box like section frame (FIGS. 7 and 8) made up of a base 170, a rear end wall 172, parallel side walls 174, 176 and a top plate 178. The base 170 comprises two parallel box girders 180 (which support wheels 11) joined by transverse members 182, 184.

Figure 4:
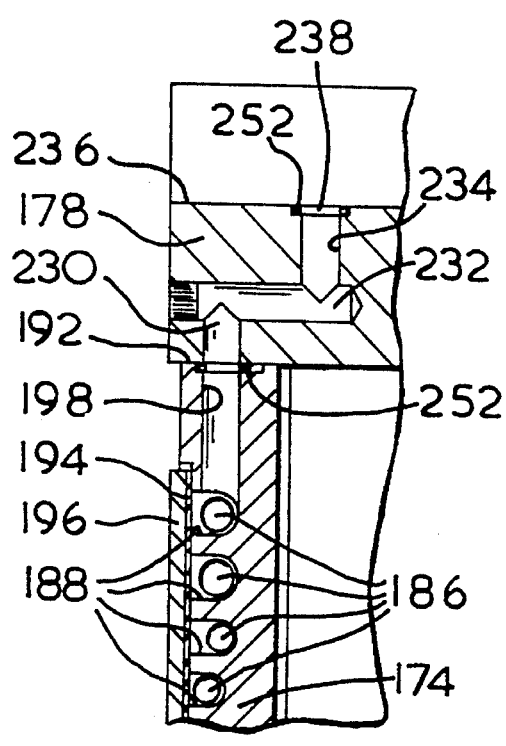
FIG. 4 shows a view along a line IV—IV of FIG. 8.
Figure 5:
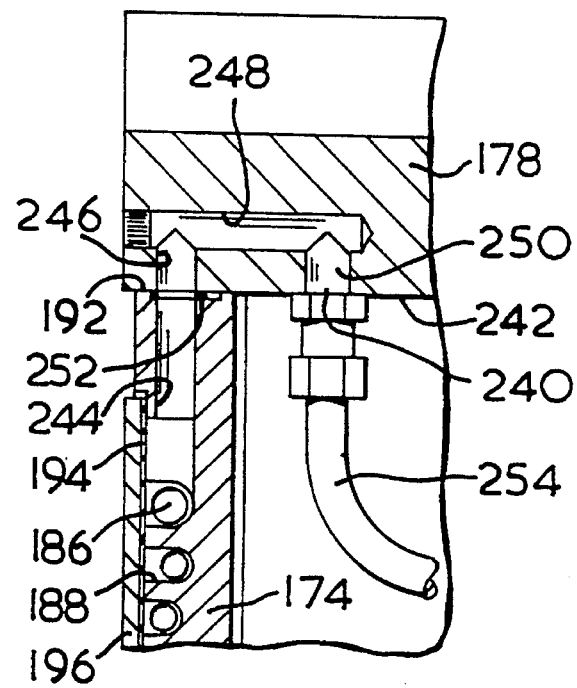
FIG. 5 shows a view along a line V—V of FIG. 8.
Figure 6:
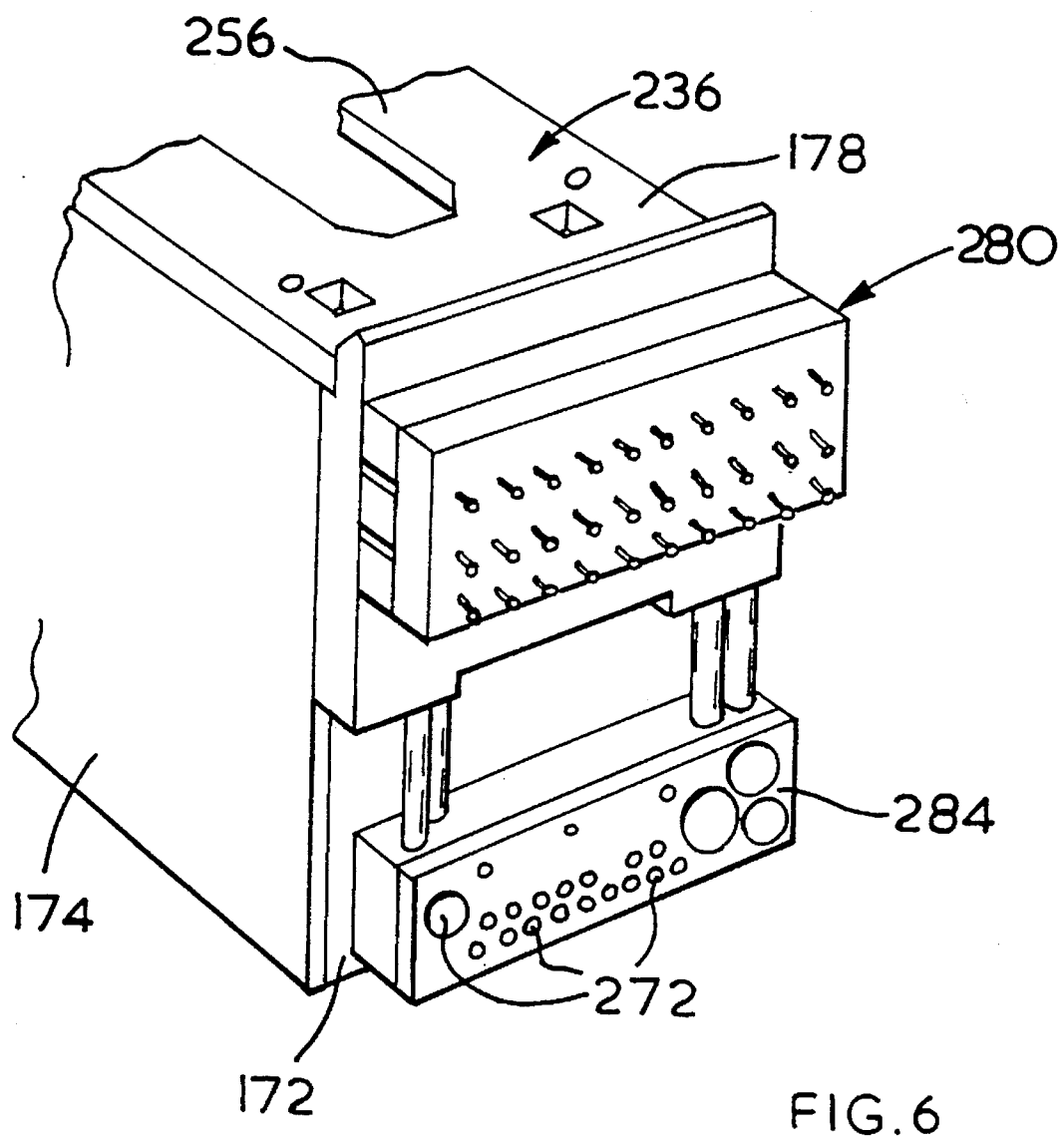
FIG. 6 shows a rear perspective view, partly broken away, of the section module.
Figure 14:
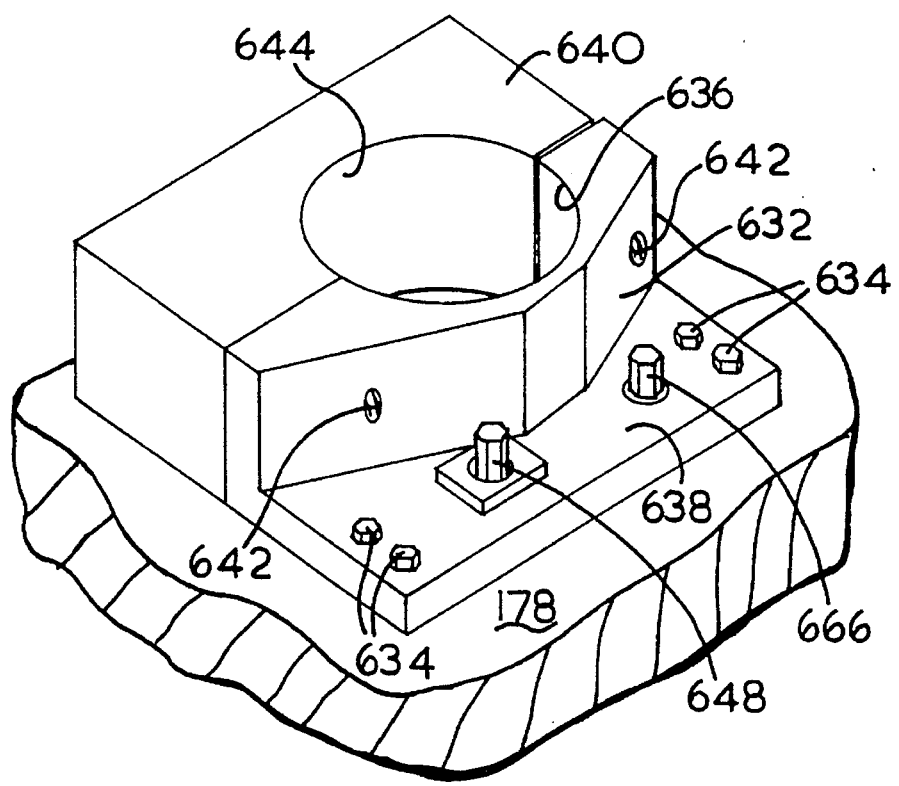
FIG. 14 shows a view of locating blocks of the take out mechanism.
Figure 15:
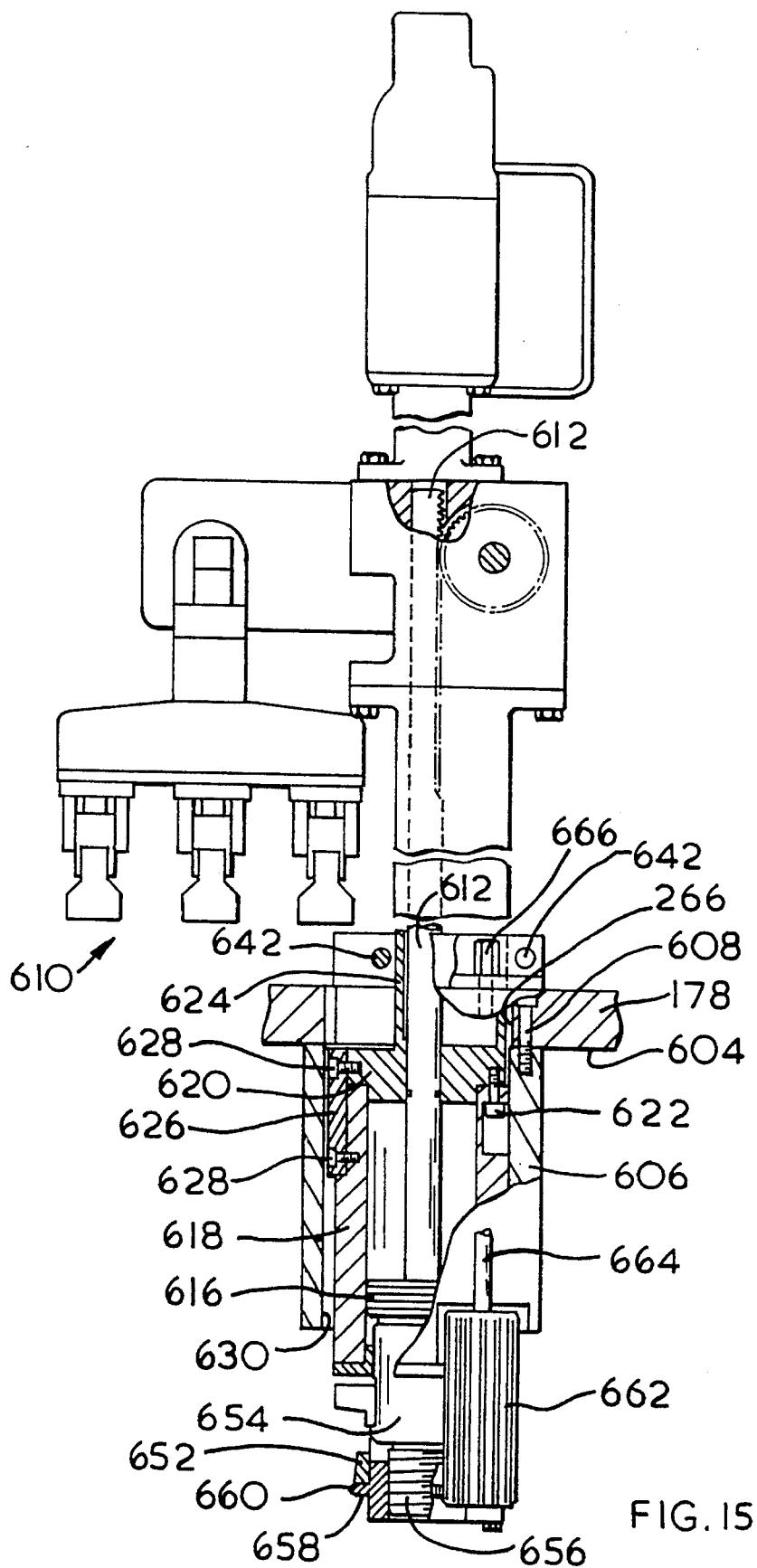
FIG. 15 shows a view corresponding to FIG. 13 but viewed at right angles to it.

The side walls 174, 176 are provided with integral air passages 186, (only some of which are shown) FIGS. 14 and 15 show the construction of the side wall 174—the side wall 176 is similarly constructed. The wall 174 is provided with a series of grooves 188 which lead from entry ports 190 in a rear end face of the side wall, progress horizontally along the sidewall; most of them then lead upwards to a top face 192 of the sidewall. The grooves 188 are closed by a gasket 194 and a side plate 196 to provide air tight air passages 186. FIG. 4 shows one of the passages 186 which leads to an exit port 238 on an upper surface 236 of the top plate 178—the passage 186 leads to a short vertical bore 198 which opens onto the top face 192 of the sidewall. The top plate 178 comprises a short vertical bore 230 which opens to a horizontal bore 232 which in turn leads to a short vertical bore 234 which opens into the exit port 238 on the upper surface 236 of the top plate 178. FIG. 5 shows another of the passages 186 which leads to an exit port 240 on an under surface 242 of the top plate 178. This passage 186 opens to a short vertical bore 244 which leads to the top surface 192 of the side wall. The top plate 178 comprises a short vertical bore 246 which opens to a horizontal bore 248 which in turn leads to a short vertical bore 250 which opens into the exit port 240 on the lower surface 242 of the top plate and is connected to a pipe 254. O rings 252 around the various exit ports provide for appropriate air tight sealing.

The top plate 178 comprises openings designed to accept the various mechanisms of the section module, a number of exit ports for the operating air to operate such mechanisms and openings through which cooling air can be supplied. The openings in the top plate 178 comprise two openings 255, adapted to receive operating shafts of the blank mould opening and closing mechanisms, an opening 256 adapted to receive plunger mechanisms, an opening 258, adapted to receive a baffle mechanism, an opening 260 adapted to receive a funnel mechanism, an opening 262 adapted to receive an invert/revert mechanism, two openings 264 adapted to receive operating shafts of a blow mould opening and closing mechanism, an opening 265 adapted to receive the blow mould cooling mechanism, an opening 266 adapted to receive a takeout mechanism and an opening 268 adapted to receive a blowhead mechanism. The top plate 178 also comprises two openings 257 for the supply of cooling air to the blank mould mechanism, and an opening 259 leading to a cullet chute to accept parisons which for some reason have to be rejected rather than passed to the blow mould mechanisms.

Air is supplied to the various passages 186 in the walls 174 and 176 from a valve block 280 which is mounted on the rear of the section module.

The valve block 280 is connected to exit ports 112 of the piping module providing high pressure air, low pressure air, pilot air and exhaust and provides a supply of controlled operating air to the various pneumatically controlled mechanisms. In general, operating air is provided through the valve block 280 when the facility to adjust the pressure of the operating air during operation of the section module is required: the valve block 280 comprises a series of restrictor valves which are arranged for easy adjustment by the operator.

A piping block 284 having a series of entry ports 272 is secured to the rear end wall 172 of the section module SM. The piping module PM and the Section module SM are secured together when the modules are both in their operative position by a captive bolt.

When the piping module PM is thus secured in its operative position, floating bushings 287 make for airtight connection between the exit ports 160 of the distributor block 140 and the entry ports 272 of the piping block 284. The piping block 284 comprises exit ports 296 which convey the plunger up air, vacuum on air and plunger cooling air from the corresponding exit ports 112 of the piping module, to flexible pipes 290 which lead through the section to plunger mechanism of the section module.

The mechanisms which are mounted in the openings 255–268 in the top plate 178 of the frame of the section module are generally conventional in construction, but are modified so that in general they are mounted only on the top plate 178 to cooperate with the air exit ports on the top plate, and are also mounted that they can readily be removed from the top plate without requiring access to the interior of the section module.

The mould opening and closing mechanisms are as conveniently described in our pending application EP 93300145 and EP 93300146. The mounting of a blow head mechanism and of a takeout mechanism will be described, and it will be understood that the principles used in mounting these mechanisms on the top plate 178 can readily be adapted to other mechanisms.

A blowhead mechanism 360 (FIGS. 9, 10, 11 and 12) is described to illustrate the positioning of operating mechanisms in the section module of the machine. The operating portions of the blowhead mechanism, which are only shown diagrammatically, are similar to those conventionally used, while the mounting of the mechanism in the section and its connection to the necessary air supplies are described in detail.

The blowhead mechanism comprises a base member 362 which comprises a flange portion 364 and an upstanding cylindrical portion 366. The cylindrical portion has a vertical bore 368 in which a piston rod 370 which carries a piston head 372 moves. The bore 368 also comprises relieved portions 374, 376.

Secured to the flange portion 364 by bolts 365 is cylinder head member 378 to which is attached a downwardly extending cylinder 380 in which is secured a lower cylinder head member 382; the piston rod 370 extends through both the head members 378 and 382. An operating cylinder is thus provided by the cylinder 380 and the two head members 378 and 382, and the piston head 372 lies in this operating cylinder. A lower sleeve 384 is secured to the cylinder 380 and a conventional oil cushioning device (not shown) which acts on the piston rod 320 is mounted in the sleeve 384.

Mounted in the sleeve 384 is a conventional camming arrangement (not shown) which causes the piston rod 370 to rotate in a desired fashion while performing a reciprocating movement.

The flange portion 364 comprises a horizontal downwardly facing surface 367 which engages the flat horizontal upper surface 236 of the top plate 178, and the cylinder head member 378, the cylinder 380 and the sleeve 384 extend downwardly from the top plate 178 through the aperture 268.

The cylinder head member 378 has a part circular outline, comprising two arcs 385, 385, which define opposed vertical locating faces which closely engage inner vertical circular locating faces of the aperture 268 when the blow head mechanism is in position. The blow head mechanism is thus precisely located, firstly by the mating engagement of the vertical arced locating faces 385, 385 with the vertical locating faces of aperture 260, and also by bolts 386 securing the flange portion 364 to the top plate 178.

Operating air for the blow head mechanism 360 is provided from ports in the top plate 178. Blowhead up air is provided through a pipe 388 which leads to an exit port 240 [see FIG. 5] in the under surface of the top plate 178 and is connected, in a fashion similar to that shown in FIG. 5, to one of the air passageways 186 in the sidewall 176. The pipe 388 is connected to a passageway 390 in the top plate 178 which opens to an exit port 392 surrounded by an 0 ring 394. The port 392 mates with an entry port 396 in the flange portion 364 and leads through a vertical bore or conduit 398, a transverse horizontal bore 400, and a downward bore 402 to a pipe 404 which leads to a bore 408 through a block 406 fixed in the cylinder 380 and a passageway 410 in the head member 382 into the interior of the cylinder 380 below the piston head 372.

Blowhead down air is similarly provided from an exit port (not shown) in the upper surface of the top plate 178 which mates with an entry port 412 in the flange portion which leads to a vertical bore 414 which leads to a horizontal bore 416. The bore 416 connects to two transverse horizontal bores 418, 420 and to a downward bore 422. Another downward bore 424 connects to the horizontal bore 420. The bore 422 leads, through a check valve 426 in the cylinder head member 378 into the interior of the cylinder 380 above the piston head 372: the bore 424 leads through a vertical bore 427 and a horizontal bore 425 into the interior of the cylinder 380.

A conventional cushioning adjustment 423 is secured to a block 421 fixed to the cylindrical portion 366. Two pipes 419,417 lead to two exit ports 413, 415 in the upper surface of the flange portion. The exit port 413 is connected to a transverse bore 411 in the flange portion 364 which is connected to the interior of the cylinder 380 above the piston head 372 by a passage (not shown).

The exit port 415 connects to the transverse bore 418.

As the piston head 372 moves towards completion of its up stroke, the piston head covers the bore 425, so that air cannot pass out through the bore: air is prevented from passing out through the bore 422 because of the check valve, and is thus forced into the transverse bore 411, thence to the pipe 419 to the cushioning adjustment 423. Air is exhausted from this adjustment through the pipe 417 to the port 415 and the transverse bore 418. Cushioning of the ends of the up stroke is thus provided.

It can be seen that the contour of the parts of the blow head mechanism 360 below the top plate 178 is smaller than the contour of the aperture 268, and thus, by undoing the bolts 386 the blowhead mechanism can be removed from the aperture 268 as a whole: there is no need to undo any pipe connections. A repaired or replacement mechanism can then be replaced in the aperture 268, and on replacing and tightening the screws 366 the air connections are made between the exit ports in the top plate 178 and the entry ports in the under surface of the flange portion 364. The mechanism is automatically positioned in its correct vertical position by engagement between the downwardly facing surface of the flange portion 364 and the surface 236 of the top plate 178, and correctly positioned by the engagement of the arcs 385, 385 of the cylinder head member 378, with the aperture 260, and correctly oriented by the bolts 386.

While the supply of lubricating oil and oil for the oil cushioning device is not described, it will be understood that arrangements are made to supply the oil from ports in the top plate 178 similar to those to supply operating air, and that consequently no extra operation to ensure supply of oil is necessary when replacing a mechanism.

Figure 13:
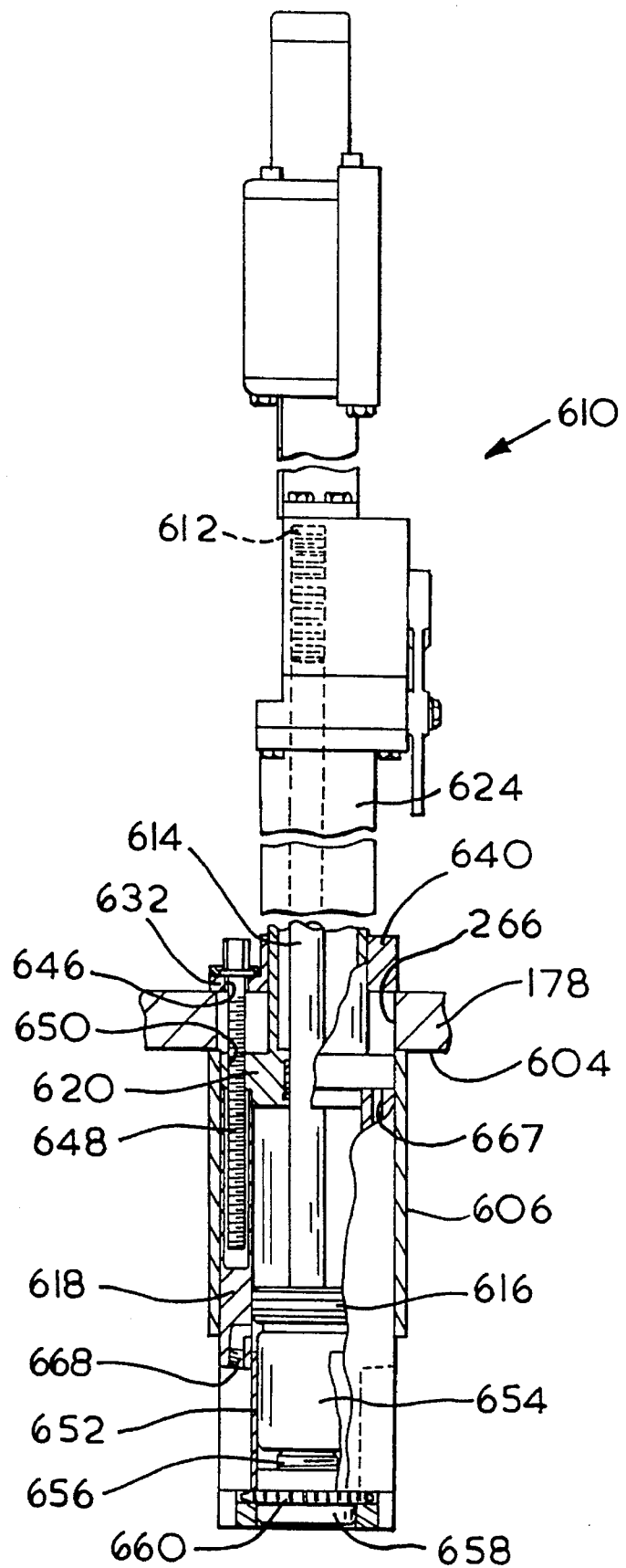
FIG. 13 shows a view, partly broken away of a take out mechanism.

A takeout mechanism of the I.S. machine is shown in FIGS. 13, 14 and 15. This mechanism is readily locatable in the machine, and can be replaced with much less work than previous such mechanisms, but is not, unlike other mechanisms of the machine, supplied with operating air through passages in the machine frame: accessibility to the take out mechanism from the end of the section means that the advantages of such an air supply would not be as significant as with other mechanisms.

Extending downwardly from an underface 604 of the top plate 178 adjacent the aperture 266 is a locating sleeve 606, which is secured to the top plate 178 by bolts 608, only one of which is shown.

The take out mechanism comprise a conventional take out head 610 operated by rack 612 which extends upwardly from a piston rod 614. The piston rod 614 is secured to a piston head 616 which is mounted for movement in a cylinder 618. An upper end of the cylinder 618 is closed by a head member 620 which is secured to the cylinder 618 by three bolts 622 (only one of which is shown). The head member 620 is welded to a cylindrical shroud 624: the piston rod 614 passes through the head member 620 and extends upwardly to the rack 612.

The cylinder 618 is a close fit in the locating sleeve 606 and comprises a key 626 secured to it by bolts 628 (one of which extends into the head member 620) which key is a close fit in a keyway 630 formed in the inner surface of the sleeve 606. It will be understood that the locating sleeve 606 thus accurately locates the cylinder 618 both along its vertical axis and radially of that axis.

The shroud 624 extends freely through the aperture 266. Secured to the upper face of the top plate 178 by bolts 634 is a locating block 632 having a semi circular locating recess 636 and a flange portion 638, through which the bolts 634 pass. A further locating block 640 is secured to the block 632 by bolts 642 and comprises a similar locating recess 644—on tightening of the bolts 642 the recesses 636 and 644 closely engage the shroud 624 and clamp it securely in position.

Passing through a bore 646 in the flange portion 638 is a long bolt 648 whose head engages the flange portion 638 and whose screw threaded shank is engaged in a threaded bore 650 in the head member 620, the shank extending into a bore in the wall of the cylinder 618. If the clamp provided by the block 632,640 is released by slackening the bolts 642, the height of the cylinder 618, and thus of the take out mechanism, can be adjusted by rotation of the bolt 648.

Secured to a lower end portion of the cylinder 618 is a part cylindrical supporting sleeve 652. A stroke limiting and cushioning device 654 of conventional construction is slidably mounted in the sleeve 652 and comprises a threaded boss 656 which extends downwardly into a rotatable member 658 which is mounted against axial movement but free to rotate in the sleeve 652. The member 658 has an external gear ring 660 which engages an elongated pinion 662 which is mounted on a shaft 664 which extends through the wall of the sleeve 606 and through the top plate 178 and the flange portion 638 to an adjusting bolt head 666. Rotation of the head 666 thus causes rotation of the shaft 664 and the pinion 662. This causes rotation of the member 658 which causes axial movement of the boss 656 and thus of the stroke limiting and cushioning device 654. Thus the lower most position of the piston rod 614 and thus an end position of the takeout mechanism can be adjusted.

Air is supplied to the interior of the cylinder 618 through appropriate passages (e.g. 667) in the wall of the cylinder 618 which lead to openings 668 (only one of which is shown). Quick release couplings (not shown) are provided for the connection of air supplies to these openings.

The takeout mechanisms can readily be removed and replaced in the machine. To remove the mechanism, the bolt 648 is removed, and the pinion 662 and the shaft 664 are also removed. The two air lines are uncoupled and then if the block 640 is loosened by loosening the bolts 642, the mechanism can be removed upwardly from the machine. Replacement of the mechanism follows the reverse procedure, the mechanism being vertically aligned by the locating sleeve 606 and orientated by the key 626. Height adjustment can be obtained by adjustment of the bolt 648, and fine adjustment of the lower end of the stroke of the piston obtained by adjustment of the portion of the cushioning device 654 by rotation of the bolt head 666.

We claim:

1. In a glassware forming machine the improved comprising a section frame including a top plate having a flat upper surface portion and an aperture having a plurality of vertical locating faces defined in said upper surface portion, a blow head including a flange portion having a flat bottom surface portion for engaging with said flat upper surface portion of said establish a precise vertical alignment between said section frame and said blow head and also including a vertical cylindrical surface having a plurality of vertical locating faces for matingly engaging with said top plate vertical locating faces of said section frame to establish a precise horizontal alignment between said section frame and said blow head to form a, said flange portion of said blow head including a plurality of air conduits communicating at said bottom surface portion and said top plate including a corresponding plurality of air passageways communicating at said upper surface portion, each of said corresponding plurality of air passageways in communication with said corresponding plurality of flange portion air conduits whereby said air connections between the blow head and the section frame can be made when said blow head and section frame are both vertically and horizontally aligned.

2. A glassware forming machine according to claim 1, wherein said vertical locating faces of said blow head and said vertical locating faces of said section frame are both circular.

* * * * *